Oct. 13, 1936.　　　　G. W. BAILEY　　　　2,057,287
EYEGLASSES
Filed May 6, 1935
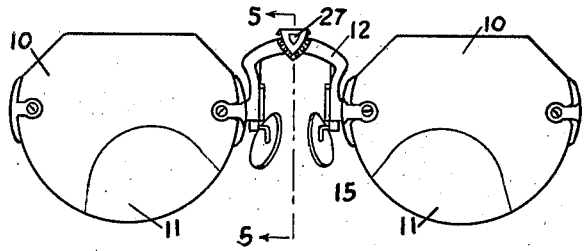
FIG. 1.
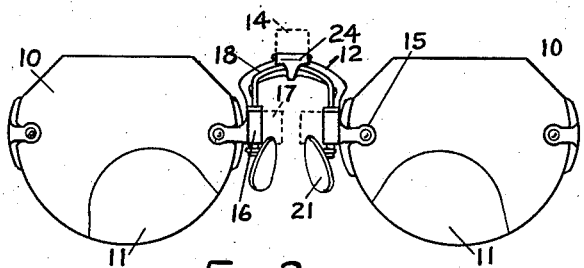
FIG. 2.
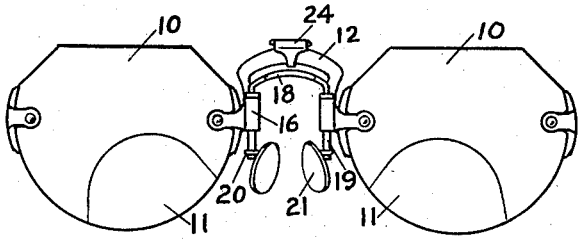
FIG. 3.
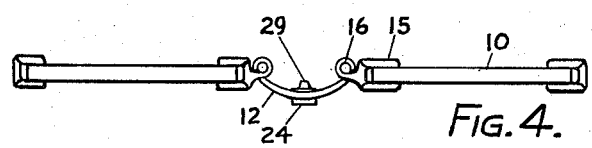
FIG. 4.
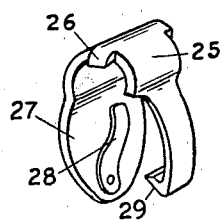
FIG. 7.
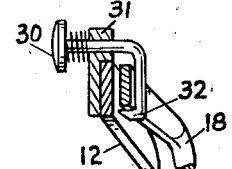
FIG. 8.
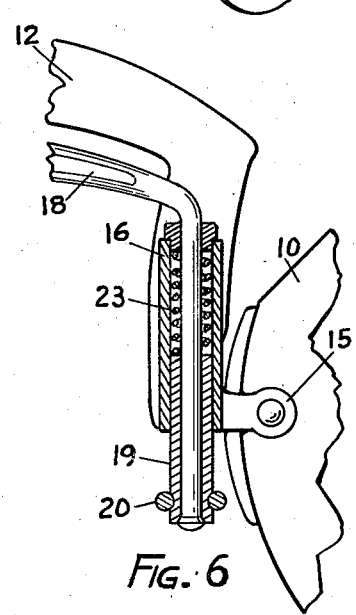
FIG. 5.
FIG. 6.
INVENTOR.
GEORGE W. BAILEY
BY Louis Telmer
ATTORNEY.

Patented Oct. 13, 1936

2,057,287

UNITED STATES PATENT OFFICE 2,057,287

EYEGLASSES

George W. Bailey, Cortland, N. Y.

Application May 6, 1935, Serial No. 19,975

10 Claims. (Cl. 88—49)

This invention relates to multifocal eyeglasses comprising a pair of lenses that may be mounted in a novel manner by an interconnecting metallic rim frame or rimless bridge means. The present improvements are primarily concerned with a simple and compactly disposed bridge actuating device of the manipulative type whereby both lenses of such eyeglasses may be conveniently shifted from a centralized control point into alternative raised or lowered positions with respect to the wearer's normal line of vision.

My sectional lens frame is preferably of the two-part extensible type of which one component includes a semi-rigid, laterally flexible bridge piece that may be given a decorative U-shaped configuration. The respective depending leg ends thereof each mount lens receiving rim means or the like eyelet strap that marginally engages a lens in the conventional fashion.

The resilient central arch region of this bridge piece may be kept flat in profile so as to virtually lie in a common plane with the lens faces. Masked behind such vertically disposed bridge piece in substantial registry with its U-shaped contour, there is superimposed a similarly shaped yoke or lens actuating frame component of which the respective terminals are equipped with complementary nose pads. These opposed pads are disposed to bear evenly inward upon the sides of the wearer's nose in the now conventional fashion rather than downwardly upon the nose ridge so as to afford a more comfortable lens support that shall be free from irritating inflammation or other contusion.

The medial region of such yoke may be likewise flattened to impart a predetermined degree of lateral flexibility between the mounted lenses. The respective terminal regions of said yoke are slidably mounted into a pair of tubular guideways respectively carried upon a corresponding leg end of my bridge piece to allow of shifting the lenses in unison relative to said twin pads while the eyeglasses are operatively mounted upon the wearer's nose. Manipulative means are provided for retaining the respective frame components in their extended or collapsed shift positions.

Although the prior art discloses certain other devices that obviate the necessity for assuming an unnatural head or eye position when utilizing either the distance or the near vision field of bifocal lenses, my objective is to devise an inherently neat sectional lens frame of the extensible type that shall be operable from a centralized point in an obvious manner without requiring extensive changes in the prevailing frame structures when designed to carry twin nose pads; also to restrict all needed supplementary members to parts that shall not appear cumbersome or otherwise tend to detract from the ready salability and general use of eyeglasses when so equipped.

Fastidious wearers naturally resent any defacement and an outstanding aim of the present embodiment is to contrive an inconspicuous and commercially practicable auxiliary framework designed to achieve the desired shift of the focal lens field in a properly subordinated manner that does not strikingly attract attention to itself nor require some prominent structural feature that is unusual to conventional eyeglasses.

To this end, I provide for a latchable finger lever or other push fixture mounted centrally upon the arch region of the frame bridge. When the glasses are in use, my bridge piece may conveniently be pressed downwardly toward said nose pads to lower the pair of distance lenses, which causes the telescopically mounted yoke component to assume its collapsed or latched position with respect to the bridge component. A gentle pressure exerted upon the finger lever inwardly toward the wearer's nose profile, serves to release the latched yoke, which in turn allows the glasses to be automatically raised under the urge of spring tension and thereby bring both reading lenses into the user's line of vision. In order to avoid confusion on part of the wearer, the described lens movements have been so chosen as to be perfectly natural and to conform with expectations. The cited finger lever together with its associated bridge may be given a pleasing ornamental trim free from bothersome projections and without detracting from the normal appearance of a conventional framework. In addition, my centralized control agency is fittingly located and kept unobstructedly accessible for finger manipulation while the eyeglasses are being worn.

A further object of my invention is to provide for relatively flexible but strong frames for multifocal eyeglasses of the indicated character that may be designed as a marketable commodity and to incorporate the required bridge shifting mechanism in such fashion that a unit of this kind may be economically manufactured without unduly raising its fabrication cost as compared with a corresponding conventional frame of the non-extensible type. Included herein are also other structural aspects intended to carry out the cited purposes, all of which will hereinafter be more fully defined.

Reference is had to the accompanying one sheet of drawings which are illustrative of a preferred embodiment of my invention, and in which drawing:

Fig. 1 is a front elevational assembly showing a pair of eyeglasses equipped with my vertically adjustable bridge means.

Figs. 2 and 3 present rear views of the Fig. 1 disclosure in which the lenses are respectively lowered and raised relative to the nose pads.

Fig. 4 depicts a bottom view of Fig. 3 with the yoke component removed to clarify certain structural details.

Fig. 5 shows a cross-sectional view in magnified scale as taken along line 5—5 of Fig. 1 and Fig. 6 details a similar view along line 6—6 of Fig. 5.

Fig. 7 represents an enlarged perspective view of my manipulative lever as used in Fig. 1, while Fig 8 illustrates a modified form thereof.

Referring now in detail to the drawing, this particular embodiment comprises a pair of bifocal eyeglasses of which the upper section 10 usually serves as the distance lens and the lower section 11 serves as the reading lens. Temple bars may be pivotally attached to the outermost rim portion of each such lens by suitable eyelets. The respective innermost rim portions of such lenses may each be apertured for securement to a relatively flat bridge piece 12 that is preferably stamped up from sheet metal. The central arch region of such U-shaped bridge may be kept laterally resilient to some extent and thrown forwardly in the bowed fashion indicated in Fig. 4.

The topmost crown or ridge portion of said arch may be provided with an integral trunnion 13 whose horizontal axis lies parallel to the plane of the lenses. This trunnion may be initially formed in the shape of an overhanging flat wing portion 14 upon the bridge stamping as represented in dotted outline in Fig. 2, which wing is then curled into an upstanding trunnion of the kind illustrated in Fig. 6.

In addition to the conventional eyelet or equivalent lens receiving means 15, each leg end of said bridge also fixedly carries a tubular guide barrel such as 16, of which latter the respective vertical axes substantially align with the lens faces. Such complementary guides may be formed integrally with the bridge piece by the use of wings 17 that may be similarly stamped up and oppositely curled into place to receive the respective legs of my lens actuating yoke member 18.

Said yoke component may be fabricated from high grade wire which is here given a U-shaped contour conforming to the bridge piece so that the yoke member may be substantially concealed therebehind in the assembled manner shown in Fig. 2. The medial region of the yoke 18 is preferably flattened in alignment with the arch profile of the bridge as indicated in Fig. 5 to impart a limited combined lateral yield or flexibility to the pair of lenses mounted on said inner eyelets 15.

Each yoke terminal region may be tightly embraced by a guide sleeve such as 19, and which sleeve is loosely mounted to slide within its guide barrel 16. The lower end of each sleeve may be grooved to receive an offset stanchion 20 therearound shaped to mount the nose pad 21 as detailed in Fig. 5, although it is preferred to form the stanchion and sleeve in a single piece. The upper end of each barrel may be partially closed by an apertured cap or equivalent thrust block means such as 22 and have a small helical compression spring 23 interposed between said block and its sleeve. The thrust of said twin springs tends to evenly raise both glasses away from the respective nose pads and to bring their respective reading lenses into the wearer's normal line of vision. A stop pin 18A may be used to limit the upward bridge lift. It will be obvious that the described telescopic mounting is such as to allow the bridge piece to be depressed at will toward the respective nose pads against spring tension; the distance lenses are thereby shifted into operative position, when the medial yoke region will fall behind and into substantial registry with the arch of the bridge piece.

As is cross-sectionally indicated in dotted profile by Fig. 5, the flattened medial yoke region may then be latched in place by the one-piece finger lever or rocker 24 of the sheet metal type depicted in Fig. 7. This bifurcated rocker is preferably disposed to straddle the crown ridge of the bridge piece and may be provided with an intermediate perimetrically open socketed portion 25 shaped to slide over the trunnion 13. Retaining lugs such as 26 respectively overhang the sockets ends and are adapted to be loosely clinched over the trunnion confines. The faced front rocker lip or escutcheon trim plate 27 of such tiltable lever is preferably given a decorative configuration adorned to match the surrounding embossing of the bridge arch in the manner indicated in Fig. 1. A flat return spring 28 may be fastened behind said plate to normally throw the rocker forwardly into its full lined Fig. 5 position. The opposite or depending rear end of the rocker 24 is equipped with a latch or detent 29 having a relatively long inturned beveled hook that automatically engages the acute lower yoke edge when the latter assumes the aforesaid registering dotted position. By pressing the escutcheon 27 inwardly toward the bridge piece, this will throw the rocker 25 into the dotted Fig. 5 position to release the latch 29, whereupon the helical springs 23 cause the bridge arch and the corresponding yoke portions to separate vertically into their respective full lined extended positions.

As a substitute for the rocker 24, the Fig. 8 push button device 30 may likewise be resorted to. A bearing pad 31 may be fixed to the arch of the bridge piece as shown and slidably mounted therein is a rod having a latch hook 32 depending therefrom whose function is identical with the previously cited latch 29.

In the present embodiment, the nose pads 21 are carried by the yoke extremities and the lens mountings are kept laterally flexible. The respective guide barrels 16 are fixedly mounted upon the bridge member and arranged to move bodily toward or away from said pads through a small travel distance of several millimeters. In addition, my latch mechanism is centralized so as to afford manipulation from a single accessible point located immediately above the nose profile of the user and at the topmost region of the bridge crown, all without necessitating the removal of the eyeglasses during such manipulative use. A mere finger touch of the escutcheon 27 causes the eyeglasses to lift automatically while a slight downward pressure exerted upon the bridge arch toward the wearer's nose, correspondingly depresses the eyeglasses and simultaneously recharges the spring 23 for a subsequent release of the engaged detent 29. Said escutcheon is kept free from barriers and ample in size to be readily located.

It is pointed out that the return spring 28 is not essential, since the rear overhanging portion of the rocker 24 may be counterweighted to drop by gravity into latched engagement. Because such rocker latch portion generally lies rather close to the forehead while the eyeglasses are being worn, said latch may thereby be urged forwardly without need of a return spring.

It is thought the foregoing disclosure is sufficiently comprehensive to make evident how to fabricate and manipulate my improved extensible eyeglass frames. While I have shown concealed coil springs 23 that are neatly housed within the guideways 16, such lens lifting effort may also be exerted by other resilient means mounted exteriorly of said guideways when arranged to likewise thrust between the frame components. Other inherent advantages are believed to be apparent to those skilled in this art, it being understood that I reserve the right to modify the structural elements of my illustrative embodiments to meet commercial requirements, all without departing from the spirit and scope of my invention heretofore described and more particularly pointed out in the appended claims.

I claim:

1. In eyeglasses comprising a pair of multifocal lenses substantially lying in a common plane, the combination of a two-part lens-interconnecting frame structure of which one component comprises a U-shaped bridge piece having leg ends each mounting thereon lens receiving means together with a guideway aligning with the aforesaid plane, and which other frame component includes a cooperative yoke slidably mounted in the respective guideways and which components are shiftably assembled to move between extended and collapsed positions, a separate nose pad carried by each yoke terminal region, and centralized lever means provided with a latch that automatically retains said components in one such shift position, said lever means being fulcrumed upon the arch region of the bridge component about an axis directed longitudinally of the lens plane.

2. In eyeglasses comprising a pair of multifocal lenses substantially lying in a common vertical plane, the combination of a two-part lens-interconnecting frame structure of which one component comprises a U-shaped bridge piece having depending leg ends each mounting thereon lens receiving means together with a vertically disposed tubular guideway and the crown region of which bridge piece is provided with centrally disposed trunnion means extending horizontally in axial alignment with the lens plane, and the other component of which frame comprises a yoke slidably mounted in the respective guideways and which components are shiftably assembled to move between extended and collapsed positions, resilient thrust means urging the respective frame components into one such shift position, and rocker means including a latch hook, said rocker being fulcrumed upon the aforesaid trunnion with the hook thereof disposed to automatically engage the yoke when said frame components are shifted into the other position.

3. In eyeglasses comprising a pair of multifocal lenses substantially lying in a common plane, the combination of a semi-rigid two-part frame arranged to interconnect said lenses and of which frame one component comprises a relatively flat, U-shaped bridge piece having a crown region that is kept relatively flexible crosswise of said plane and each leg end of which bridge piece serves to mount lens receiving means together with a guideway aligning with the aforesaid plane, and the other component of which frame is slidably mounted in said guideways and comprises a mated U-shaped yoke having a medially flattened region corresponding to the similar flat crown region of the bridge piece, the aforesaid crown region and the medial yoke region being relatively shiftable into and out of registry and arranged to preserve lateral flexibility between the interconnected lenses, resilient thrust means urging said crown region and the medial yoke region out of registry, and manipulative latch means disposed upon the crown region of the bridge piece and serving to retain said medial yoke region in registry with said crown region against the thrust means.

4. In eyeglasses comprising a pair of multifocal lenses substantially lying in a common vertical plane, the combination of a two-part lens-interconnecting frame structure of which one component comprises a U-shaped bridge piece having depending leg ends each mounting thereon lens receiving means together with a vertically disposed tubular guideway provided with thrust block means, and which other frame component comprises a yoke slidably mounted through the respective guideways to render said components relatively shiftable, a nose pad carried by each such yoke terminal region beneath the guideway thereof, spring thrust means interposed between said thrust block means and its contiguous nose pad serving to urge the lenses into a relatively raised position, and centralized manipulative means carried in the arch region of the bridge piece and which means includes a detent that releasably retains said lenses in a relatively lowered position when the bridge piece is bodily depressed against spring thrust toward the respective nose pieces.

5. In eyeglasses comprising a pair of multifocal lenses substantially lying in a common plane, the combination of a two-part lens-interconnecting frame structure of which one component comprises a U-shaped bridge piece having depending leg ends each mounting thereon lens receiving means together with a vertically disposed guideway, and which other frame component comprises a yoke slidably mounted in the respective guideways and which components are shiftably assembled to move between extended and collapsed positions, a nose pad carried by each yoke terminal region, resilient thrust means urging the respective frame components into their extended position, and a unitary bifurcated lever of which the branches straddle the crown region of the bridge piece, one such branch being shaped to constitute an escutcheon plate and the other branch being provided with latch means disposed to engage a contiguous yoke portion when the frame components are collapsed.

6. In eyeglasses comprising a pair of multifocal lenses substantially lying in a common plane, the combination of a sectional lens-interconnecting frame structure including a pair of relatively movable components of which one component comprises a U-shaped bridge piece having depending leg ends each mounting thereon lens receiving means together with a guideway aligning with the lens plane and the crown region of which bridge piece is provided with centrally disposed trunnion means that extend lengthwise of said plane, and which other frame component comprises a yoke slidably mounted in the respective guideways, and a latchable lever having a socket portion intermediate its ends and which socket is sized to operatively engage said trunnion, said lever serving to interlatch the frame components against relative movement.

7. In eyeglasses comprising a pair of multifocal lenses substantially lying in a common plane, the combination of a two-part lens-interconnecting frame structure of which one component comprises a relatively flat U-shaped bridge piece having leg ends each mounting thereon lens receiving means together with a guideway aligning with the aforesaid plane, and which other frame component includes a cooperative yoke slidably mounted in the respective guideways and which components are shiftably assembled to move between extended and collapsed positions, a separate nose pad carried by each yoke terminal region, resilient thrust means urging the respective frame components into their extended position, a detent device retractibly mounted along one side face of said bridge piece and which device is automatically lifted into engagement with the yoke when the frame components are brought into collapsed position, and finger manipulative means located along the opposite side face of the bridge piece serving to release the detent device and which means are kept accessible for finger manipulation while the eyeglasses are being worn.

8. In eyeglasses comprising a pair of multifocal lenses substantially lying in a common plane, the combination of a two-part lens-interconnecting frame structure of which one component comprises a relatively flat, U-shaped bridge piece having leg ends each mounting thereon lens receiving means together with a guideway aligning with the lens plane, and which other frame component includes a cooperative yoke slidably mounted in the respective guideways and which components are shiftably assembled to move between extended and collapsed positions, a separate nose pad carried by each yoke terminal region, resilient thrust means urging the respective frame components into their extended position, and a single latchable rocker of the self-returning type fulcrumed upon the bridge piece and serving to retain said components in collapsed position against the thrust means, said rocker including a manipulative escutcheon plate that is depressible inwardly toward one side face of the bridge piece to release the rocker when latched and which escutcheon plate is kept free from contiguous barriers likely to interfere with the manipulation thereof.

9. In eyeglasses comprising a pair of multifocal lenses, the combination of a two-part lens-interconnecting frame structure of which one component comprises a unitary U-shaped bridge piece stamped from sheet metal to include a pair of integrally formed wings that are oppositely struck up from the respective leg ends of the bridge piece and shaped to constitute aligned tubular guideways, and the other of such frame components comprising a yoke slidably mounted in the respective guideways and which components are shiftably assembled to move between extended and collapsed positions, resilient thrust means urging the respective frame components into one such shift position, and centralized fixture means including a manipulative detent that is retractibly mounted upon the crown region of the bridge piece and which detent latches the yoke when said components are shifted into the other position.

10. In eyeglasses comprising a pair of multifocal lenses, the combination of a sectionalized framework including a pair of cooperative components that are relatively movable of which one such component comprises a U-shaped bridge piece having depending leg ends which each fixedly mount thereon lens receiving together with guideway means, and which other component comprises yoke means slidably mounted in the respective guideway means to allow said components to be shifted between collapsed and extended frame positions, a separate nose pad carried by each yoke terminal region, actuating means carried by said framework and serving to automatically impel the bridge from collapsed into extended position with respect to said nose pads and which bridge upon being raised is adapted to be returned toward the nose pads into collapsed position by depressing the raised bridge piece while the eyeglasses are operatively worn and means for retaining the bridge in its depressed position, said means being centralized in the crown region of such bridge.

GEORGE W. BAILEY.